March 25, 1941.   H. J. NESS   2,235,965

WELDING AND BRAZING

Filed Jan. 8, 1938

1 STEEL
4 IRON-COPPER ALLOY
3 COPPER
5 IRON-COPPER ALLOY
2 STEEL

1 STEEL
4 IRON-COPPER ALLOY
3 COPPER
5 IRON-COPPER ALLOY
2 STEEL

INVENTOR
*Harold J. Ness*
BY *Marvin J Reynolds*
ATTORNEY

Patented Mar. 25, 1941

2,235,965

UNITED STATES PATENT OFFICE 2,235,965

WELDING AND BRAZING

Harold J. Ness, Bloomfield, N. J.

Application January 8, 1938, Serial No. 184,087

13 Claims. (Cl. 113—112)

This invention relates to the metallurgical operation of welding or brazing of metal parts and particularly to the uniting of parts of like or unlike metals by an intermediate metal of lower melting point capable of alloying with or securely bonding to the parts to be united.

Heretofore, in the art of brazing of such metals as iron or steel, considerable difficulty has been encountered due to the oxidation of the parts, the formation of an oxide of the metal preventing a proper bonding therewith of the copper or other welding or brazing material employed. The process ordinarily employed consists in applying copper or a copper alloy at the joint between the parts to be welded and heating the parts to above the melting point of the brazing or welding material, so that the copper alloys with the steel at the joint whereby an alloy bond is produced. The process is carried out in a hydrogen or cracked hydro carbon gas atmosphere in order to prevent or minimize oxidation of the parts.

This process is objectionable because it necessitates the use of specially constructed furnaces and auxiliary equipment and a careful control of the gas supplied thereto. Moreover where hydrogen is used the large volume of hydrogen required to carry out the process is both dangerous and expensive. As a result copper welding has not been used as freely as it otherwise would.

One of the objects of the present invention is to provide a process of brazing or welding, which is safe, convenient and inexpensive.

Another object is to provide such a process which may be carried out in an ordinary gas, oil or electric furnace without the use of muffles or other reducing gas containing chambers segregated from the products of combustion.

A further object is to permit the direct heating of the parts to be welded, by the furnace gases.

A still further object is to improve the mechanical properties of the welded or brazed joint and to produce a denser and sounder weld metal.

A further object is to promote a proper fusion between the welding and brazing metal and the parts to be joined and to promote a proper penetration of the welding or brazing metal into the adjacent metals to be joined.

A further object is to decrease the time required to effect the welding or brazing operation.

Another object is to prevent decarburization or other alteration of the composition or structure of the metals to be united, during the welding or brazing process.

Another object is to protect the parts to be united, both physically and chemically during the welding or brazing operation.

A further object is to enable cooling of the parts in air without oxidation or contamination of the parts.

A still further object is to increase the fluidity of the bonding metal and to decrease the interfacial tension between the bonding metal and the parts to be joined.

Other objects and advantages will hereafter appear.

The terms "welding" and "brazing" are used without discrimination herein, to refer to the uniting of metal parts by an intermediate bonding metal, irrespective of whether the bonding metal is only partially or completely alloyed with the metal of the parts joined thereby or whether mechanically bonded thereto, as by penetration into the interstices of the joined metals, and the term "bonding metal" is used to designate any metal capable of alloying with or mechanically bonding to the parts to be joined.

In accordance with the present invention an ordinary heat treating furnace may be employed for carrying out the welding or brazing process by providing the same with a lithiated atmosphere. The use of lithium compounds for producing a furnace atmosphere in which welding operations can be performed is described in my copending application Serial No. 79,968, filed May 15, 1936, and entitled Metallurgical Process and the present application is a continuation in part of said prior application. The lithiated atmosphere may be provided in a gas fired furnace, for instance, by introducing a small quantity of a compound of lithium, such as lithium carbonate, oxide, hydroxide, chloride, or lithium containing ores such as spodumene or amblygonite or mixtures thereof in powdered form, into the air or gas stream leading into the furnace or it may be injected or blown directly into the furnace through an aperture provided in one of the walls thereof. An apparatus for introducing the powdered lithium compounds directly into the furnace or into the air or gas conduit extending thereinto is fully disclosed in my copending application Serial No. 143,410, filed May 19, 1937, and entitled Injecting apparatus. In an oil fired furnace the lithium compounds may be added directly to the oil, either as an oil soluble compound or in colloidal suspension. A process of treating fuel oil with lithium compounds is disclosed in my copending application Serial No. 154,203, filed July 17, 1937, and entitled Promotion of combustion. In the case of electric furnaces the lithium compounds may be mixed with powdered carbon, such as graphite, and the mixture blown in a fine spray into the furnace in the manner set forth in my copending application Ser. No. 143,411, filed May 19, 1937, and entitled Metallurgical process, now Patent 2,181,094, Nov. 21, 1939.

The amount of lithium compound required to produce the requisite condition of the furnace atmosphere is very small but is not critical and may be readily determined by experiment for any particular furnace. It should be sufficient to produce a rich lithium color when the furnace gases are viewed with the naked eye. Too great a quantity cannot be used, however, since it tends to extinguish the flame. The furnace should be operated on the reducing side, that is, with a slight deficiency of oxygen from that required for complete combustion so that the furnace gases will contain a small percentage of carbon monoxide, the purpose of which will hereinafter appear. The lithium compounds introduced into the furnace result in the formation of lithium metal, lithium oxide and lithium carbonate in the furnace atmosphere. The lithium metal serves to eliminate free oxygen from the furnace atmosphere with the formation of lithium oxide. The lithium oxide unites with carbon monoxide in the furnace atmosphere to form lithium carbonate and metallic lithium. The lithium carbonate thermally dissociates into carbon dioxide and lithium oxide. When the parts to be welded are placed in the furnace, compounds of lithium, mainly the oxide or carbonates, so present in the atmosphere condense thereon and form a protective coating over the surfaces, protecting the same from any oxidation and decarburization that might otherwise occur. This coating remains on the parts throughout the welding process and as a result, as soon as the fusion of the bonding metal is complete, the parts may be immediately removed from the furnace and permitted to cool exteriorly thereof, differing in this respect from welding operations conducted in hydrogen or cracked hydrocarbon gases.

In carrying out the welding or brazing process of the present invention, the furnace is brought up to the welding temperature and the lithium compound is continuously or substantially continuously introduced into the furnace or into the air or fuel stream leading to the furnace in such quantity as to produce a rich lithium color in the furnace gases. The metal parts to be joined, either with a strip or sheet of the bonding metal interposed therebetween or disposed adjacent the joint, are introduced into the furnace. The lithium not only neutralizes the oxidizing effect of the furnace gases but as stated, the parts immediately become coated with a protective layer composed primarily of lithium compounds. The parts to be joined are retained in the furnace until the bonding material has completely fused, after which they may be removed and cooled externally of the furnace. At the time the parts are placed in the furnace and for a brief interval thereafter a copious supply of the lithium compound may be introduced into the furnace, if desired, in order to promote a rapid formation of the protective coating on the parts to be welded, and thereafter the supply of the compound may be reduced to the minimum amount required to maintain the coating thereon. The coating tends to vaporize from the parts as the heating continues and by maintaining a small continuous supply of the compound to the furnace, this evaporation is either prevented or additional amounts of the compound are deposited on the parts as the evaporation occurs, so that the coating is retained intact. The lithium compound coating on the parts may also act as a flux to assist in the brazing action but whatever the action of the lithiated atmosphere, either by direct action on the parts or due to such condensation or formation of a film thereon, the parts are retained free from oxidation and decarburization, the bonding metal becoming highly fluid, wetting both parts to be joined and flowing into intimate contact therewith. As a result a sound homogeneous weld occurs which is actually stronger than the parts joined thereby.

The bonding materials are preferably copper and alloys containing copper, such as brass, german silver, silver or its alloys, etc., and when the term "copper" or "silver" is used herein and in the appended claims, the same is intended to include copper and copper containing alloys or silver and silver containing alloys. In the case of copper welding, a temperature of about 2100° F. is required whereas if brass, german silver, or silver are employed, the temperature will be reduced since the melting points thereof are somewhat lower than that of pure copper. For instance, with a brass of the composition 65% copper and 35% zinc, the welding or brazing temperature may be around 1750° F.

The materials to be joined may be of like metals such as iron to iron, or steel to steel or of unlike metals, such as copper to iron or ordinary steel to alloy steel and the process is useful in the production of such articles as turbine rotors, steel tubing, automotive and refrigerator parts, cylinder barrels, thermostatic metals, steel pulleys, etc. In fact, any two metals may be joined by employing as the bonding material a metal or alloy of lower melting point than either of such metals and capable of readily alloying or bonding with and spreading as a thin film over the contacting surfaces of the metals to be joined.

In order that the invention will be more fully understood, reference will be had to the accompanying drawing in which.

Figure 1:
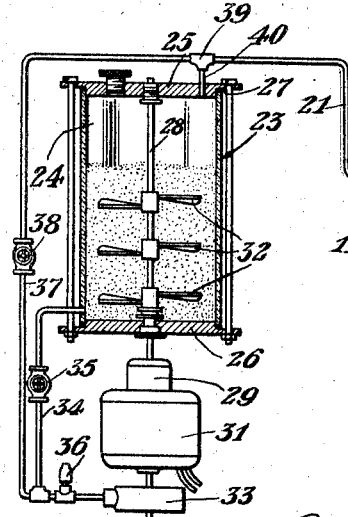
Fig. 1 is a vertical sectional view of a treating furnace of the gas fired type, provided with means for providing a lithiated atmosphere therein.

Referring first to Fig. 1, I have shown a conventional furnace 10 of the indirectly fired, hearth type, provided with burners 11 designed to burn either gas or oil. The furnace lining and other refractory parts of the furnace may be composed largely of silicon oxide. A lining which has been found suitable for treating temperatures up to about 1800° F. analyzes as follows: silica 65%, alumina 25%, titanium oxide 1.2%, and the remainder impurities and volatile constituents. It is not necessary, however, that the lining be of this particular composition, since linings have been found satisfactory having a silica content as low as about 31% with approximately 62% alumina and the remainder mainly iron oxide and titanium oxide. However, the furnace lining may be composed of hard burned brick of low permeability and low porosity containing approximately 50% silica and 44% alumina, having a bulk density of about 1.2 oz. per cu. inch and a fusion point of about 3200° F. For furnaces operating at temperatures below about 1800° F. a less dense and less refractory brick may be employed. A suitable cement for bonding the bricks such as sillimanite, cyanite and andalusite, may analyse as follows: silica 38.07%, alumina 56.63%, titanium 1.14%, iron oxide .73%, ignition loss 2.78% and the remainder moisture and other impurities. This cement may also be used as a coating for the bricks after their assembly in the furnace. In general, moulded or tamped-in linings have not been as satisfactory as linings built up from hard burned refractories, apparently due to the reaction of the lithium or one of its compounds with the binder employed in such moulded linings and the high permeability thereof. Linings, hearths and other refractory parts of the furnace consisting of or containing silicon carbide have been found to react detrimentally with the lithium of the atmosphere, due possibly to the nature of the binder commonly employed, causing breakdown of the refractory and to some extent, reduction in the efficiency of the lithium containing atmosphere for its intended purpose. When the lithium or its compounds are introduced into the furnace through the burner or at a point adjacent thereto, the flame should not impinge directly on the refractory, particularly in furnaces operated at high temperatures. Disposed upon the hearth 12 are the parts to be welded or brazed. The parts 13 represent steel pulleys comprising a shiv 14 and hub 15, which preferably have a close sliding or drive fit on each other. If the parts to be joined are sufficiently close together the welding metal will alloy completely with the metal of the parts so that there will be substantially no free or unalloyed welding or brazing metal between the parts and the surfaces will be united by a strong interstitial alloy. The welding or brazing metal in the example even consist of a ring 16 of copper or brass wire disposed about the hub of the pulley adjacent the joint. As a further example, two steel plates 17 and 18 are shown having a thin sheet 19 of copper placed therebetween. Preferably the plates 17 and 18 are clamped together in order to increase the contact therebetween.

The furnace is provided with a supply of a compound of lithium, such as lithium carbonate, through a conduit 21 extending through the wall of the furnace above one of the burners. A supply of lithium compound may be provided by an injecting apparatus of the form shown in the aforesaid application Ser. No. 143,410. In Fig. 1, I have shown a modified form of such apparatus comprising a container 23 consisting of a cylindrical tube 24, preferably of glass, having flanged upper and lower closure members 25 and 26 respectively, clamped against the ends of the tube 24 in any suitable manner, with interposed gaskets 27. Extending axially through the container 23 is a shaft 28, journaled in the closure members 25 and 26. The shaft 28 is driven through suitable reducing gears 29 by a motor 31. Mounted upon the shaft 28 are several sets of blades 32, adapted to agitate the powdered lithium carbonate which is contained in the chamber 23. Air under pressure is supplied by a blower 33 also driven by the motor 31, the air being conducted by a tube 34, into the lower wall of the container 23 and passing out of the container laden with the powdered compound, through the conduit 21, extending into the furnace.

A valve 35 controls the flow of air into the chamber 23 and consequently the amount of lithium compound blown into the furnace. A relief valve 36 is provided to regulate the air pressure supplied by the blower.

Figure 4:
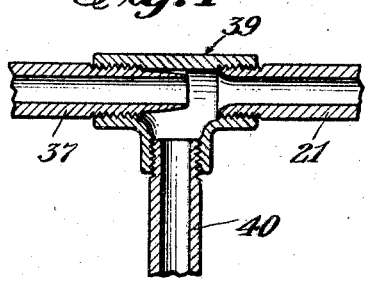
Fig. 4 is a vertical sectional view of the Venturi tube 39 shown in Fig. 1.

In order to prevent fusing of the lithium salt as it passes through the tip of the conduit 21, I by-pass a part of the air from the blower 33 through a conduit 37, provided with a suitable regulating valve 38. The air flowing in conduit 37 is conducted through a Venturi tube 39, shown in detail in Fig. 4, disposed adjacent the outlet 40 of the container 23, so as to assist in the withdrawal of the compound laden air from said container. The additional air provided through the conduit 37 not only serves to maintain the terminal of the conduit 21 cool, but is supplied at sufficient pressure to blow the powdered compound through the conduit at such speed that fusing thereof to the wall of the tube, adjacent its tip is prevented.

In place of employing air to inspirate the powdered compound I may supply gas or a combustible mixture of air and gas to the inlet of the blower 33. By supplying a gas and air mixture to the blower, the ratio of gas and air in the furnace is not disturbed by the fluid medium employed to convey the powders into the furnace. Where such combustible mixture is employed, preferably a flame arresting valve is included in the line 21 extending into the furnace to prevent back flash through the line. If desired, a screen or mesh may be disposed about the end of the conduit 21 to break up the flame and also to prevent flash back. The inlet 21 should preferably be located relative to the parts to be heated so that the lithium compound laden gas stream does not impinge directly on such parts but that the compound will be first reduced to metallic form and diffused into the furnace atmosphere, particularly when air is used as the inspirating or carrying medium.

In carrying out the present process the furnace is brought up to heat and the motor 31 started. The valve 35 is then opened to permit air or a gas and air mixture from the blower to pass through the chamber 23. In so doing it picks up some of the powdered lithium compound carrying it into the furnace 10. Under the conditions prevailing in the furnace the lithium compound, or at least a portion thereof, breaks down liberating free metallic lithium. The reaction is apparently first the formation of lithium oxide which reacts with carbon monoxide as follows:

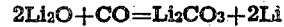
$$2Li_2O + CO = Li_2CO_3 + 2Li$$

The lithium carbonate of the above reaction is again broken down to lithium oxide liberating carbon dioxide and the reaction is repeated.

The valve 35 should be adjusted so as to cause a flow of the lithium compound bearing air or air and gas mixture into the furnace. The amount of lithium compound required to produce the requisite condition of the furnace atmosphere is very small but is not critical. It should be sufficient to produce a rich scarlet colored flame when the gases leaving the furnace are viewed with the naked eye. The amount of the compound required varies with the compound used, the type and construction of the furnace, the location therein of the parts to be welded and the temperature attained in the furnace. The carbonate is preferred for general use due to its ease of handling, and its relatively cheap cost. The amount of any particular lithium compound to be used, in order to provide the desired protective coating, fluidity of the bonding metal and consequently its proper penetration into the metal to be joined, can be readily determined by experiment, as for instance by making one or more test heats or the parts can be observed as the heating continues to determine if a proper coating is forming thereon. I have found, in certain gas furnaces fired with artificial gas that excellent results are obtained with the use of approximately 0.008 ounce of lithium carbonate per cubic foot of gas but the amount required is not critical and may vary within wide limits either side of the figures mentioned. Equivalent amounts are required in oil burning furnace for equal heat generation. In electric furnaces I add carbon monoxide to the furnace or a supply of carbon from which carbon monoxide may be generated, in order to obtain a reduction of the lithium oxide in accordance with the foregoing equation. When the proper lithium condition is obtained in the furnace, the parts to be treated are introduced therein, as through the door 22. If desired the parts may be placed on a traveling conveyor and passed through the furnace at such rate as to complete the welding operation during their passage therethrough. The door 22 may be opened freely during the process, for the introduction or removal of parts or it may be left open continuously, if desired, without danger of oxidation of the parts.

The temperature of the furnace, at the heating zone, must be sufficient to melt the welding or brazing metal. The free metallic lithium which is always present in the furnace, as determined by spectroscopic analysis of the furnace gases, exerts a cleansing action on the metals to be joined, thereby putting the surfaces thereof in the optimum condition for alloying with the bonding metal. The lithium acts on the bonding metal to render the same oxygen free and also more fluid upon melting, and as a result of this and the clean condition of the surfaces to be joined, it readily wets such surfaces and flows freely between the parts, penetrating into the surface of the metals to be joined and thereby promoting a strong alloy bond. Since the bonding metal is rendered gas free by the lithium, it is extremely dense and sound.

The presence of the lithum metal in the furnace gases permits the welding process to be carried out without the use of protective muffles, and directly in the furnace gases without scaling, decarburization or other detrimental effect on the metal parts being united. In fact none of the embrittling effects or other modification of the grain structure obtained in welding in hydrogen or other reducing gases, are experienced. Furthermore, as stated, there is a deposition or condensation of the lithium and/or lithium compounds which forms very quickly on the parts and which physically protects the surfaces thereof from any contaminating or oxidizing influence of the furnace atmosphere. As a result of the protective atmosphere and of this protective coating high carbon alloy steels may be welded without decarburization and alloy steels united without altering the composition thereof. The coating deposits apparently either as an oxide or a carbonate of lithium or both and adheres to the parts throughout the welding or brazing operation and after removal from the furnace, so that when the welding is complete the parts may be immediately removed from the furnace and cooled in the air. Upon cooling the coating appears to be mostly the carbonate of lithium.

The valve 35 is kept open or partially open throughout the process so as to supply the lithium compound continuously to the furnace during the welding operation, but of course, if desired, the amount of compound may be varied as the welding process continues. As was stated, a copious supply of the lithium compound may be supplied immediately after the parts are placed in the furnace, to insure the rapid formation of a protective coating thereon, the amount being thereafter reduced to a point just sufficient to maintain a pronounced lithium containing atmosphere in the furnace. If desired the compound may be supplied in frequent but intermittent increments.

The nature, appearance and color of the protective coating vary with the type of furnace employed, the location and composition of the parts therein, the amount of the compound used and the temperature and period heating. In some instances the coating formed is not visible, the parts, however, remaining clean and unoxidized. The coating may be readily removed by dipping the parts, either when hot or after cooling, in a weak acid solution, such as acetic or hydrochloric acid. An inhibitor is preferably added to the acid to prevent etching of the metal. The parts, after the coating has been dissolved therefrom, are bright, the entire process being effected without the removal of any detachable amount of metal from the parts joined together.

Since the parts may be introduced directly into the furnace when the furnace is up to the welding or brazing temperature, and heated by direct contact with the furnace gases, the welding or brazing metal fuses very quickly and since the parts may then be removed immediately from the furnace without preliminary cooling, it is evident that the entire process may be conducted in a very short period of time as compared to prior processes which require a more gradual and indirect heating of the parts in a protective gas, such as hydrogen or cracked hydro-carbon gases, and subsequent gradual cooling thereof in the protective gas.

Figure 2:
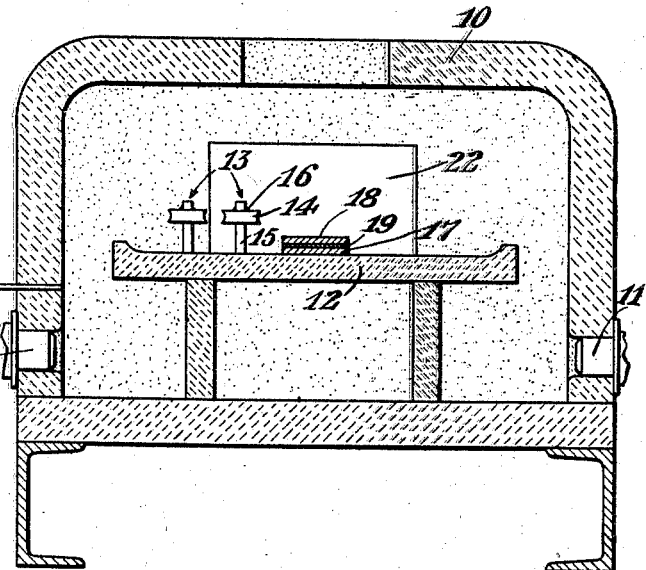
Fig. 2 is a photomicrograph, taken at the magnification of 100X of a copper weld between steel parts, produced in accordance with the present invention.
Figure 2:
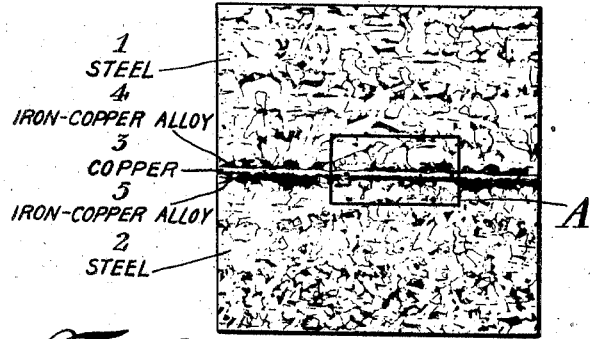
Figure 3:
Fig. 3 is a photomicrograph of magnification 500X, of that portion of the specimen shown in the rectangle A of Fig. 2.

In Figs. 2 and 3 I have shown photomicrographs of two steel parts 1 and 2, united by an intermediate layer of copper. Fig. 2 is of 100X magnification and Fig. 3 is a magnification of 500X, of that part of the specimen shown in the rectangle A of Fig. 2. It will be noted that at each side of the copper 3 is a layer or strata 4 and 5, appearing as black areas, due to the action of the etching solution, of iron copper alloy, showing that the copper has penetrated and alloyed with the iron to a considerably greater depth than similar metals welded or brazed in hydrogen or other reducing gases. The depth of the penetration of the copper indicates extreme cleanliness of both the steel and the copper and great fluidity of the copper resulting from the action of the lithium thereon.

It is obvious, of course, that many variations may be made in the process described, without departing from the invention and I contemplate all such changes and modifications thereof as come within the confines of the appended claims.

What I claim is:

1. The method of intimately uniting metal parts which comprises heating said parts, in the presence of lithium vapor, in contact with a bonding metal of lower melting point than the metal of said parts and continuing the heating until fusion of the bonding metal occurs.

2. The method of welding or brazing ferrous metals with a bonding metal of copper or silver which comprises heating said ferrous metals in contact with said bonding metal, in an atmosphere having lithium diffused therein, until fusion of the bonding metal occurs.

3. The method of welding or brazing ferrous metals with a bonding metal of copper or silver which comprises heating said ferrous metals in contact with each other in a combustion furnace to a temperature at least equal to the fusion temperature of the bonding metal, applying the bonding metal in a fused condition to the juncture of said parts and maintaining a substantially continuous atmosphere containing lithium in the furnace during such heating.

4. The method of intimately uniting metal parts which comprises heating said parts, in a furnace contaning carbon monoxide, in contact with a bonding metal of lower melting point until fusion of the bonding metal occurs and introducing a compound of lithium into the furnace atmosphere during said heating.

5. The method of intimately uniting metal parts which comprises heating said parts in a non-oxidizing lithium containing atmosphere in contact with a bonding metal of lower melting point until fusion of the bonding metal occurs.

6. The method of intimately uniting metal parts by an intermediate bonding metal which comprises heating said parts in a furnace in contact with said bonding metal while the latter is in a fused condition, and introducing lithium carbonate into the furnace during said heating.

7. The method of intimately uniting metal parts by an intermediate bonding metal which comprises heating said parts in contact with the bonding metal in a furnace to at least the fusion temperature of the bonding metal, and introducing a decomposable lithium salt into the furnace atmosphere, during said heating, in sufficient quantity to produce a protective coating on said parts by deposition from the furnace atmosphere.

8. The method of intimately uniting metal parts which comprises heating said parts in contact with each other and a lower melting point bonding metal while the latter is in a molten condition and providing such parts with a protective coating consisting solely of lithium salts, throughout the heating.

9. The method of intimately uniting metal parts which comprises heating said parts in contact with each other and a lower melting point bonding metal while the latter is in a molten condition nad providing a lithium containing atmosphere in said furnace of such concentration as to cause a deposition of a lithium compound on said parts.

10. The method of intimately uniting metal parts which comprises heating said parts in contact with each other and a lower melting point bonding metal while the latter is in a molten condition, providing a lithium containing atmosphere around said parts of sufficient concentration to caues the deposit on such parts of a protective coating of lithium salt, and subsequently treating said parts in an acid solution to remove said coating.

11. The method of intimately uniting metal parts which comprises heating said parts in contact with each other and a lower melting point bonding metal while the latter is in a molten condition, providing a lithium containing atmosphere around said parts of sufficient concentration to cause the deposit on such parts of a protective coating of a metallic salt and removing said coating during or after cooling of said parts.

12. The method of intimately uniting ferrous metal parts which comprises heating said parts in contact with each other and a bonding metal of lower melting point in a furnace, in direct contact with the furnace gases, to at least the melting point of said bonding metal and preventing oxidation and decarburization of said ferrous metals by providing a protective lithium containing atmosphere in the furnace during the heating.

13. The method of intimately uniting metal parts which comprises heating said parts in contact with a bonding metal of lower melting point until fusion of the bonding metal occurs and deoxidizing said bonding metal while in a fused condition, with lithium.

HAROLD J. NESS.